J. A. WHERRY.
FISHING REEL.
APPLICATION FILED AUG. 17, 1921.
1,413,816.
Patented Apr. 25, 1922.
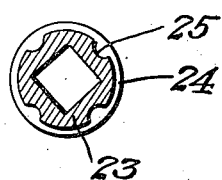
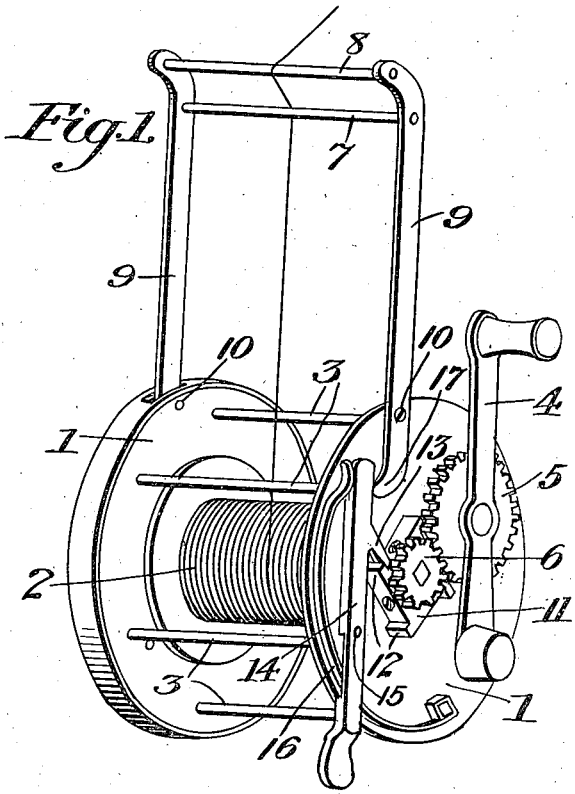
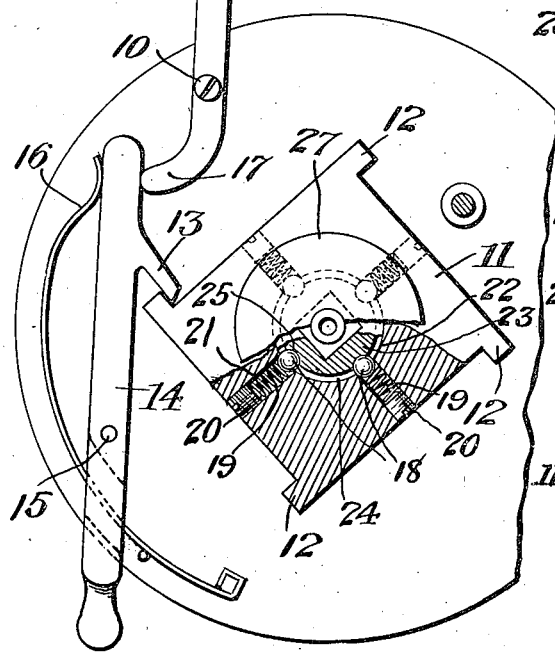
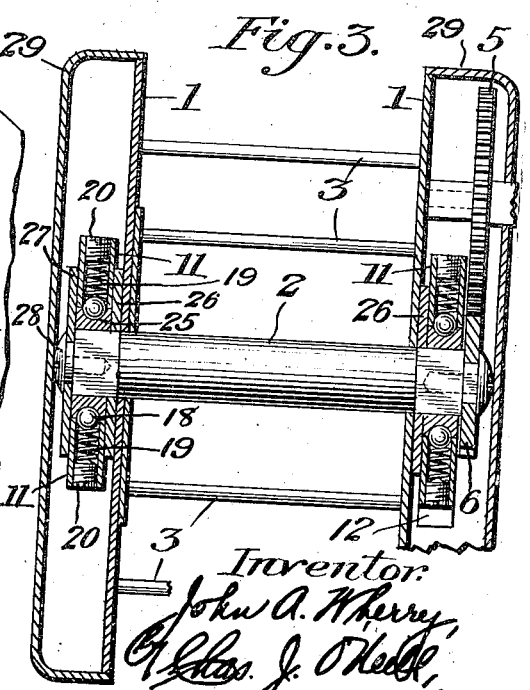

UNITED STATES PATENT OFFICE.

JOHN A. WHERRY, OF NEW ORLEANS, LOUISIANA.

FISHING REEL.

1,413,816.
Specification of Letters Patent. Patented Apr. 25, 1922.
Application filed August 17, 1921. Serial No. 492,900.

*To all whom it may concern:*

Be it known that I, JOHN A. WHERRY, a citizen of the United States, residing at New Orleans, in the State of Louisiana, have invented certain new and useful Improvements in Fishing Reels; and I do hereby declare the following to be a full, clear, and exact description of the invention, such as will enable others skilled in the art to which it appertains to make and use the same.

This invention relates to an attachment for fishing reels and particularly to an improvement over my former construction as covered by Letters Patent No. 1,303,525 issued to me May 13, 1919.

In said patented reel structure, means are provided, in the form of a check or brake to prevent the overthrowing of the line in casting or under similar conditions, or in other words to prevent said line from tangling and winding around the reel in the reverse direction when the reel is revolving at a high rate of speed. This braking means in the patent construction comprises substantially a square plate ratchet member secured to the reel shaft provided with teeth or projections at the corners thereof adapted to being engaged by a spring pressed pawl, positioned so as to be tripped by a pivoted frame or similar arrangement controlled by the tension of the fishing line, so that said pawl will be released when sufficient tension is put on said line allowing the line to run. As soon however, as the tension is relieved the pawl, by means of its spring, will be thrown into engagement with the teeth on the aforesaid square plate or ratchet member and thereby prevent the further paying out of the line.

The disadvantage and impracticability of this former construction, above referred to, resides in the fact that the sudden engagement of the pawl with the teeth of the ratchet member often times results in the breaking of the pawl.

The object of the present invention is to construct this checking and braking device so as to provide for a more gradual take-up in the line, under the condition stated, which will entirely eliminate the various disadvantages above enumerated.

This is accomplished by means of a simple clutching mechanism interposed between ratchet member and the reel shaft, so that upon the initial pull on the line said ratchet member will be allowed to rotate to a certain extent and thereafter gradually clutch itself to the reel shaft.

The preferred embodiment of the invention is illustrated in the accompanying drawing in which;

Fig. 1 is a perspective view of the type of fishing line reel to which invention is applied.

Fig. 2 is an enlarged detailed view partly in section and partly in side elevation of the improved form of braking means forming the subject matter of this invention.

Fig. 3 is a sectional view, part being broken away, of Fig 2 and,

Fig. 4 is a detailed view of the central portion of the braking device.

Referring to the drawings in detail the preferred construction of reel to which the improved braking device is adapted, comprises a reel frame consisting of end discs 1 supporting therebetween a spool 2, said discs being connected by tie rods or struts 3. The reel is provided with the usual operating handle 4 carrying a gear wheel 5 adapted to mesh with the gear wheel 6 keyed to the shaft of the spool 2 in the usual manner.

The line running from the reel 2 is led under a cross bar 7 and over a similar cross bar 8 for the purpose of enabling the occasional tension on the line to perform certain functions as will hereinafter appear. The cross bars 7 and 8 have their ends attached to a pair of parallel arms 9 which extend from the end discs 1 and mounted thereon by pivots 10.

Secured to the ends of the shaft of the spool 2, in an improved manner to be hereinafter described, are square plates or ratchet members 11 the corners of which being provided with projections or teeth 12 so arranged as to be engaged by a tooth 13 carried by a pawl 14 pivoted at 15 to the end discs 1. This pawl 14 is normally pressed into engagement with the ratchet teeth 12 by a leaf spring or the like 16. To oppose the action of the spring 16 and for the purpose of disengaging the pawl 13 at the proper time from the ratchet teeth 12, that portion of the arm 9 below the pivot 10 is provided with a curved extension 17, all of which is clearly shown in Fig. 1. It is to be noted that the arrangement as above described is carried on the outside of both of the end discs 1 of the reel. The disengagement of the pawl 13 from any one of the ratchet teeth 12 is performed when a tension is put upon the fishing line owing to the peculiar lead arrangement of the line under and over the cross bars 7 and 8 respectively, carried by the outer ends of the arms 9.

The arrangement as above described is similar to the general construction of reel as set forth in my previous patent aforesaid.

In the present construction, however, the ratchet member 11, as distinguished from the former construction, is not rigidly secured to the shaft of the reel 2, but, to the contrary, means are provided in the form of a slip clutch to permit a gradual clutching of said ratchet member to the shaft aforesaid.

This improved clutching means comprises a series of balls 18 adapted to be pressed inwardly by means of springs 19, secured and maintained by screw plugs 20, in radially disposed openings 21 formed in the ratchet member 11. Said ratchet member 11 is provided with an enlarged central opening 12 encircling a cooperating disc or the like 23. This disc 23 is constructed with a peripherial groove 24 and also with a series of recesses 25 intersecting said groove 24 and properly disposed so as to cooperate, during the operation of the device, with the balls 18.

It is to be understood that the function of the ratchet member 11, cooperating tooth 13 and the tension controlled arms 9, is to allow the fishing line to run as desired when sufficient tension is put on said line, but to check and stop the running of the line when said tension is relieved, the spring 16 forcing the tooth 13 of the pawl into engagement with one of the ratchet teeth 12 of the ratchet member 11. In the previous construction hereinbefore described, where the ratchet member 11 was rigidly secured to the reel shaft, the fishing line was suddenly checked often times resulting in the breaking off of the tooth 13 of the pawl 14 or the parting of the fishing line.

By the use of the ball slip clutch this is prevented as said ratchet member 11 will not be suddenly stopped but will be gradually clutched to the reel shaft as the spring pressed balls 18, upon the initial engagement of the tooth 13 with the ratchet teeth 12, will permit this operation in an obvious manner. However, as the speed of the running wheel is gradually reduced the balls 18 will eventually form a locking engagement with their cooperating recesses 25 formed in the disc 23. It is, of course, to be understood that the disc 23 is rigidly secured to the reel shaft.

Interposed between the clutching mechanism, above described, and the outside of the end disc 1 of the reel is a disc 26 and said mechanism is maintained in position by an outside disc 27 secured to the end of the reel shaft by a set screw or the like 28. On the side of the reel, however, carrying the gear mechanism for winding said reel the disc 27 is not used, the function thereof being accomplished in a similar manner by the gear 6.

It is to be understood that the various mechanisms carried by both of the end discs 1 of the reel are enclosed by cups or shells 29 of the usual construction. It will also be understood that the reel will be supplied with the necessary bracket for securing the same in proper position upon the fishing pole as is the usual custom.

What I claim is:

1. In a brake or check for fishing line reels, the combination with a ratchet member mounted on the reel shaft, of a pawl for engaging said ratchet member, means controlled by the tension on the fishing line for tripping said pawl, means for returning said pawl to operative engaging position upon the release of said tension and a slip clutch interposed between said ratchet member and reel shaft to permit the gradual take-up of said clutch.

2. In a brake or check for fishing line reels, the combination of a ratchet member mounted on the reel shaft, of a pawl for engaging said ratchet member, means controlled by the tension on the fishing line for tripping said pawl, means for returning said pawl to operative engaging position upon the release of said tension and a ball slip clutch interposed between said ratchet member and reel shaft to permit the gradual take up of said clutch.

3. In a brake or check for fishing line reels, the combination of a ratchet member mounted on the reel shaft, of a pawl for engaging said ratchet member, means controlled by the tension on the fishing line for tripping said pawl, means for returning said pawl to operative engaging position upon the release of said tension radially movable spring pressed members carried by said ratchet member surrounding the reel shaft, a disc like member keyed to said shaft encircled by the ratchet member and notches formed on the outer periphery of said disc like member adapted to be successively engaged by said spring pressed members for clutching said ratchet member and disc to permit the gradual take up of said clutch.

4. In a brake or check for fishing line reels, the combination of a ratchet member mounted on the reel shaft, of a pawl for engaging said ratchet member, means controlled by the tension on the fishing line for tripping said pawl, means for returning said pawl to operative engaging position upon the release of said tension, radial openings formed in said ratchet member, spring pressed balls mounted in said openings, means for adjusting said springs to normally force the balls inwardly, a disc like member keyed to said shaft encircled by the ratchet member and a raceway and intersecting recesses formed in the outer periphery of said disc like member adapted to be successively engaged by said spring pressed balls for gradually clutching said ratchet member and disc permitting the gradual take-up of said clutch.

In testimony whereof I affix my signature.

JOHN A. WHERRY.